United States Patent [19]

Grills et al.

[11] E Patent Number: Re. 32,750

[45] Reissued Date of Patent: Sep. 20, 1988

[54] FLUID OPERATED WASTE TANK SERVICING ASSEMBLY

[75] Inventors: Laurence M. Grills, Mission Viejo; Eugene F. Colditz, Huntington Beach, both of Calif.

[73] Assignee: Kaiser Aerospace & Electronics Corporation, Oakland, Calif.

[21] Appl. No.: 31,677

[22] Filed: Mar. 30, 1987

Related U.S. Patent Documents

Reissue of:

[64] Patent No.: 4,584,726
Issued: Apr. 29, 1986
Appl. No.: 629,058
Filed: Jul. 9, 1984

[51] Int. Cl.[4] ..... E03D 1/34

[52] U.S. Cl. ..... 4/378; 4/321; 4/323; 4/400; 4/407; 251/144; 251/294

[58] Field of Search ..... 4/397, 321, 399, 387, 4/400, 323, 407, 408, 249, 378; 251/144, 335.3, 335.1, 294, 335

[56] References Cited

U.S. PATENT DOCUMENTS

| | | | |
|---|---|---|---|
| 737,941 | 9/1903 | Leithausar | 251/144 X |
| 1,458,816 | 6/1923 | Fyte et al. | 251/144 |
| 2,838,765 | 6/1958 | Hosking | 4/407 |
| 3,447,777 | 6/1969 | Carlson | 251/294 |
| 3,677,294 | 7/1972 | Gibbs et al. | 251/144 X |
| 4,017,015 | 12/1981 | Judd | 251/144 X |
| 4,304,015 | 12/1981 | Hubatka | 4/407 |
| 4,338,689 | 7/1982 | Zieg | 4/400 X |

*Primary Examiner*—Henry K. Artis
*Attorney, Agent, or Firm*—Marvin H. Kleinberg

[57] ABSTRACT

A hydraulically operated drain valve is interposed in the cleaning fluid path before the spray/rinse outlet. The fluid under pressure activates a piston which operates the drain valve. A precharge reservoir is also interposed in the supply line before the spray rinse outlet to store a measured precharge which drains into the tank after the drain valve has closed. A manual override is provided to open the drain valve in the event of a failure of the hydraulic system.

14 Claims, 2 Drawing Sheets

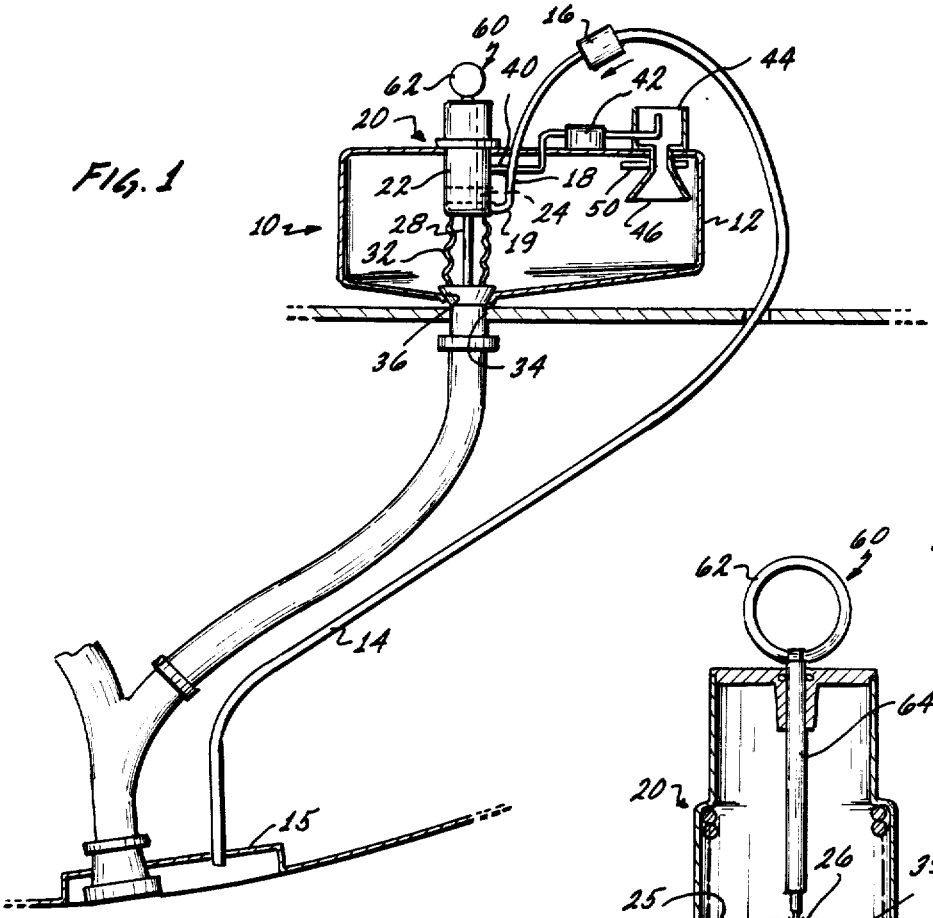
FIG. 1
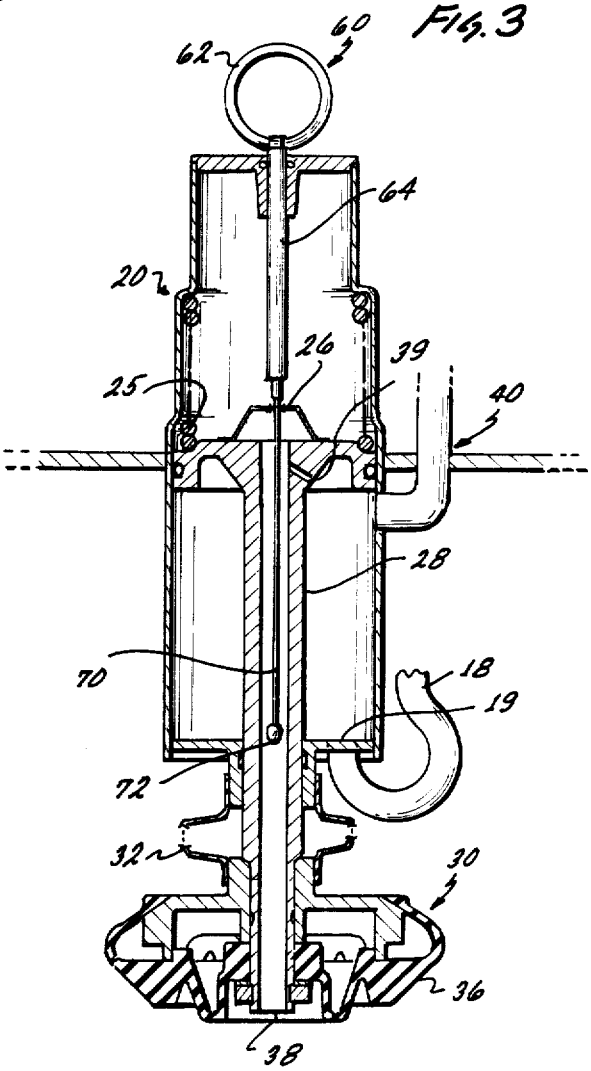
FIG. 3
FIG. 5
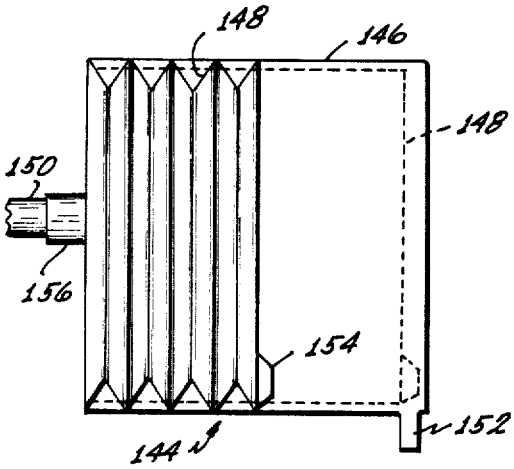

60
62
64
20
25
42
40
70
18
26
39
72
28
32
30
36
38
34

TO CHECK VALVE 42 (Fig. 2)
44
48
47
50
46

FLUID OPERATED WASTE TANK SERVICING ASSEMBLY

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to waste tank servicing assemblies and more particularly to a combination of a fluid operated drain valve in combination with a reservoir and spray rinse apparatus adapted to be installed in an aircraft lavatory waste tank.

2. Description of the Prior Art

In most aircraft lavatory systems currently in use, a waste tank is provided in conjunction with the lavatory. During a flight, the waste tank, which may be used with a recirculating toilet system or, alternatively with a fresh water system, is utilized to retain human wastes. At the conclusion of the flight, the tank is drained by ground service personnel. During that process, the tank is rinsed out with a cleaning fluid which may include deodorants and disinfectants, and is provided with a predetermined quantity of precharge liquid (depending on the installation), prior to the next flight of the aircraft.

In waste systems of the prior art, the tank drain valve is connected through a cable assembly to a manual release mechanism, which is located at the service panel. As noted in U.S. Pat. No. 4,338,689, issued July 13, 1982 to Clifford V. Zieg and assigned to the assignee of the present invention, alignment problems were encountered with a valve that was manually operable through a cable. Prior art systems employed a long rigid extension tube to assure continued alignment of the valve in the valve seat. The patent to Zieg, however illustrated a novel, elastomeric valve plug which could accomodate some degree of misalignment and still form an adequate seal for the tank.

The tanks of the prior art also included a special fitting or nipple which was adapted to connect to a servicing vehicle. The vehicle supplied a cleaning and rinsing fluid which was applied to the interior of the tank through a spray system. After the drain valve was seated, the same spray system was used to impart a premeasured precharge to the tank.

In servicing a waste tank according to prior art, a technician would couple a waste line to the nipple at the service panel. The technician would then, manually, through the use of a cable system, open the drain valve, dumping the contents of the tank into the coupled waste line. A cleaning fluid line would then be connected to an appropriate intake port through which a combination of a cleaning and disinfecting fluid could be applied, through a spray line to clean the interior of the tank while the drain valve was kept open.

After a predetermined time interval, the drain valve would be closed by releasing the cable. The tank was then precharged by permitting additional, rinsing/-cleaning fluid to be supplied for a timed interval or until the predetermined quantity of fluid had been furnished.

The prior art system became a source of at least two major problems, even with the modified drain plug of the Zieg invention. One problem was cable side loads which made actuation difficult and which contributed to breakage. A partial disassembly of the tank and aircraft was required to reinstall a new cable system. In addition, the elements of the cable system required service and maintenance and, because of the hostile environment, from time to time would become inoperable, preventing the operation of the drain valve.

A second, potentially more serious problem is caused by the service technician, when, either through inattention or carelessness, fails to shut off the cleaning/rinsing supply after the specified time interval has elapsed. As a result, the tanks are given an excessive precharge. In some instances, this would only require a premature limit on the usage of the lavatory, since, once the tank is determined to be full, further usage is prohibited. Since this circumstance will occur during the flight, the lavatory must be taken out of service. In those aircraft which have a common tank for all of the lavatories, such an excessive precharge might require a shut down of all lavatories part way through a busy flight on a crowded aircraft, to the great distress and inconvenience of passengers and crew.

A more serious consequence of an overflow of the tank during servicing is the possibility of serious structural damage to the aircraft. The cleaning/rinsing fluid tends to be highly corrosive to metallic parts and any overflow into the lavatory compartment or into the inaccessible interior of the fuselage of the aircraft, creates a potential hazard to the integrity of the structural and control elements of the aircraft.

What is needed, and what has been provided in the present invention, is a system that automatically opens the drain valve upon the application of the cleaning-/rinse fluid and, at the same time provides a predetermined quantity of precharge fluid to the tank, specific to the type of aircraft being serviced without any special attention required of the service technician.

SUMMARY OF INVENTION

An improved lavatory tank cleaning system includes a fluid operated waste drain valve and an auxiliary reservoir for precharge, serially connected thereto. The valve and tank are connected in the clean/rinse line between the intake port and the spray rinse elements.

The fluid operated drain valve includes a hydraulic piston with a return spring whose force can be overcome by the fluid pressure available from the service vehicle. The piston, in its housing, together with a rod that couples to the waste drain valve, provides substantial stability and rigidity without the usual side loads imposed by the manual pull cable, to assure continued alignment of the valve with the valve seat.

The continued provision of cleaning/rinsing fluid to the system maintains the drain valve in the open position. The flowing fluid fills the precharge reservoir and from there enters the spray rinse system. The technician can then continue to supply the cleaning/rinsing fluid for as long is necessary or desirable. So long as fluid is provided under pressure, the waste valve remains open with no danger of overfilling the waste tank.

When the fluid flow is cut off, the pressure in the line drops and the drain valve closes, seating the drain valve in its seat. The fluid remaining in the piston cylinder is vented to the center of the piston and then to the main waste line.

When the drain valve is fully closed, there remains within the precharge reservior a sufficient quantity of fluid to constitute a precharge for the tank to allow the recirculating pump to operate. In a preferred embodiment of the precharge reservoir, a container has an elastomeric closure than can slowly drain. Alternatively, a normally closed bellows assembly or an elastic, balloon type receptacle, which expands under pressure but can contract when the source of pressure is removed, can be employed as reservoirs. As these reservoirs "collapse", the fluid is supplied to the tank, either through the spray rinse system or through a drain valve in the reservoir. Even a simple tank capable of draining slowly could be employed.

The service technician need not be concerned with the precharge portion of the cycle, but rather merely turns off the fluid supply at the service panel. Next he can disconnect the waste and cleaning lines and secure the service panel. Although the actual precharging of the tank may require a finite time to complete, it will be completed long before the aircraft is placed into service. The system can be coupled to existing spray rings or can be part of a different, independent spray system, as an integral part of the tank draining and cleaning system.

The novel features which are characteristic of the invention, both as to structure and method of operation thereof, together with further objects and advantages thereof, will be understood from the following description, considered in connection with the accompanying drawings in which several preferred embodiments of the invention are illustrated by way of example. It is to be expressly understood, however, that the drawings are for the purpose of illustration and description only, and are not intended as a definition of the limits of the invention.

DESCRIPTION OF THE DRAWINGS

FIG. 1 is an idealized sketch of the waste tank servicing assembly of the present invention;

FIG. 3 is a view of the valve of FIG. 2 shown in the "open" configuration;

FIG. 5 is an alternative embodiment of a precharge reservoir useful with the present invention.

Figure 2:
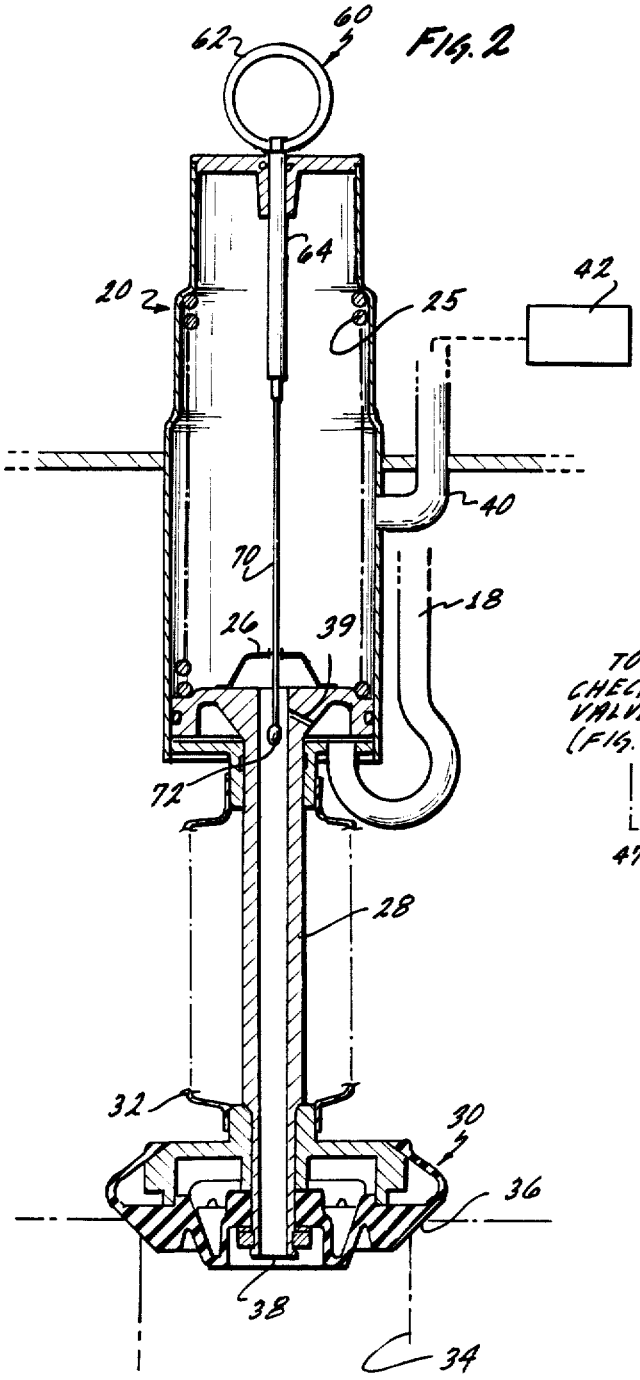
FIG. 2 is a detailed view of the fluid operated drain valve of FIG. 1.

Turning first to FIGS. 1 and 2 a waste tank servicing assembly 10 according to the present invention is illustrated in idealized diagrammatic form. A waste tank 12 is installed in the aircraft and so much of the tank 12 as is necessary to illustrate the operation of the present invention is shown.

A fluid intake line 14 leads to a fitting at the service panel 15 to which the service truck would attach a line providing cleaning and rinsing fluid to clean the tank 12. A check valve 16 is provided to supply the cleaning and rinsing fluid and is coupled, through a fluid line 18 to the intake port 19 of a fluid operated drain valve assembly 20. The drain valve assembly 20 includes a piston housing 22, a movable piston 24 and a return spring 25 that is adapted to bias the piston 24 toward the bottom at the housing in the fully extended configuration. A spider element 26 is mounted on the top of the piston 24 to permit manual actuation of the piston as explained below.

Coupled to the piston 24, is an actuator rod 28 that terminates in a self aligning valve assembly 30 as illustrated in the patent to Zieg U.S. Pat. No. 4,338,689, cited above. As in Zieg, a bellows assembly 32 surrounds the actuator rod 28 and tends to exclude the contents of the waste tank 12 from the interior of the bellows 32 and the drain valve assembly 20.

A drain orifice 34 is provided at the base of the tank 12 and is normally maintained closed by the fully extended piston 24 causing the valve assembly 30 to engage the valve seat 36. A pressure relief opening 38 extends through actuator rod 28 to equalize the pressure in the drain line with the ambient pressure in the tank 12 and to drain fluid that remains in the housing 22 when the cleaning and rinsing fluid is shut off. A bleed port 39 communicates through the piston 24 to permit flow from the housing interior of the relief opening 38. This also permits easy opening of the drain valve as well as the access port and plug of the drain line at the service panel 15 should a pressure differential otherwise exist tending to prevent easy opening.

A fluid outlet port 40 is provided in the piston housing 22 at a location in the housing 22 near the upper end of the piston stroke. Cleaning and rinsing fluid exits the fluid pressure cavity and is diverted through a check valve 42 to a precharge tank 44.

Should the pressure drop to a value wherein the bias spring 25 can overcome that pressure to return the piston 24, when the piston 24 passes the outlet port 40, the port 40 is effectively closed. If the fluid pressure is sufficient, the piston 24 will be held and the port 40 will remain open. The piston 24 and outlet port 40 might act as a "servo" circuit maintaining the piston 24 at a position wherein the fluid pressure on the piston 24 just equals the restoring force of the bias spring 25. Any greater fluid pressure further drive the piston 24, thereby passing more fluid to the outlet port 40, while a lower pressure permits the piston 24 to return, bleeding the contents of the chamber through the bleed port 39 and through the drain valve 30. As the piston 24 returns, the valve assembly 20 becomes seated in the valve seat 36.

Figure 4:
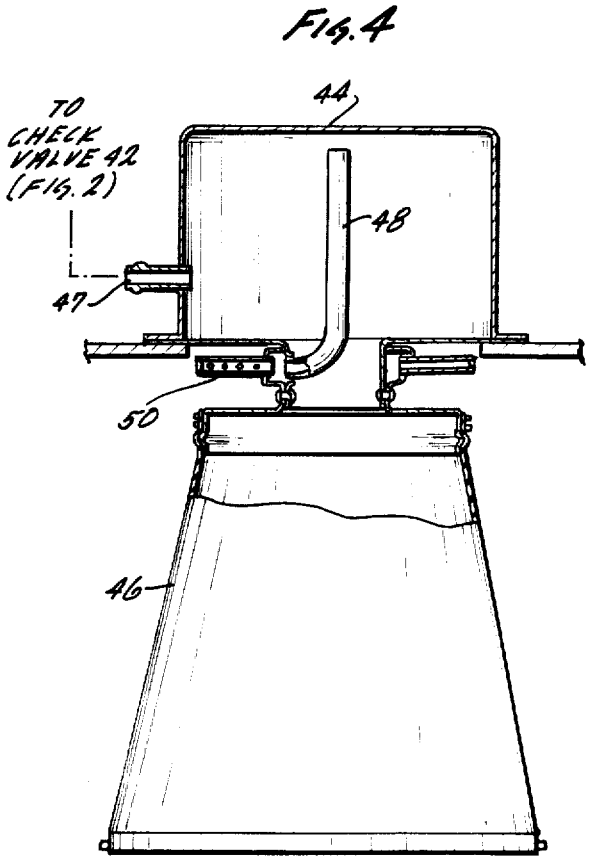
FIG. 4 is an idealized sketch of one embodiment of a precharge reservoir.

The outlet port 40 is connected to a check valve 42 and then to the precharge reservoir 44. The precharge reservoir 44 includes a structure 46 that tends to be self emptying. Possible embodiments of the self emptying tank are shown in FIGS. 4 and 5 below.

The precharge reservoir 44 includes an outlet line 48 which goes into a rotatable spray rinse nozzle assembly 50. In alternative embodiments, the outlet line 48 could be coupled to a conventional spray ring (not shown) or other waste tank cleaning apparatus which may be found in the waste tank 12.

In FIG. 3, the fluid operated drain valve assembly 20 is shown in greater detail with the piston 24 at its upper limit of travel, fully compressing the bias spring 25 and opening fluid outlet port 40. As can be seen, the bellows 32 is compressed and the self aligning valve assembly 30 is fully disengaged from the drain orifice 34 of the tank 12.

An emergency cable assembly 60 includes a pull ring 62, and a rod 64. A cable 70 passes through the piston housing 22 and through an aperture in spider element 26 and an opening in the piston 24. The cable 70 terminates in a ball cable end 72.

The aperture in spider element 26 does not permit the ball 72 to pass through and therefore upward movement of the pull ring 62 causes the ball end 72 to engage the spider 26, thereby lifting the piston 24 to its upper limit, opening the outlet port 40.

In use, it may be assumed that the waste tank 12 is ready for draining and cleaning and the aircraft is undergoing service. Maintenance personnel couple a fluid supply line to a port in the service access panel 15 and couple a waste drain line to the waste drain orifice in the service panel 15, as well. All plugs or valves at the service panel are opened in preparation for the draining of the tank 12.

The service truck then supplies cleaning/rinsing fluid under pressure to the port and through the fluid intake line 14 through the check valve 16. The fluid under pressure then drives the piston 24 against the bias spring 25, thereby withdrawing the self aligning valve assembly 30 from the valve seat 36 and drain orifice 34 of the waste tank 12. The interior of the piston housing 22 fills with fluid driving the piston 24 upward. At this point, the drain valve is fully open and contents of the tank 12 flow out into the waste drain system.

As the piston 24 nears the upper limit of travel, the piston passes the outlet port 40 allowing fluid to flow through the check valve 42 into the precharge reservoir 44.

As the cleaning/rinsing fluid continues to be supplied from the service truck, the piston 24 reaches a shoulder of the housing 22, fully opening the outlet port 40 and filling the precharge reservoir 44. Excess fluid from the reservoir 44 passes through the outlet line 48 into the spray rinse nozzle assembly 50. The interior of the tank 12 is then sprayed with cleaning and rinsing fluid which is permitted to drain from the tank 12, as well. A limited amount of fluid passes through the pressure relief opening 38 and also exits the tank 12.

Generally, a prescribed time interval is allocated for this operation. The service technician is instructed to provide cleaning/rinsing fluid for the prescribed interval. So long as fluid is being supplied from the service truck, however, the piston 24 will be held in its uppermost position and the contents of the tank 12 can freely drain into the waste line. At some point in time, however, the technician will shut off the fluid supply from the truck.

As pressure drops in the fluid line 14, the check valve 16 will close. The force of the bias spring 25 will now prevail, forcing the piston 24 downward. Any fluid trapped within the housing 22 is expelled through the bleed port 39 and will flow into the pressure relief opening 38 and then into the main waste line 34. As the piston 24 continues downward, the valve assembly 30 will seat itself in the valve seat 36 and the drain orifice 34 will be occluded.

The technician at this point may disconnect from the fluid port at the service panel 15 and, after a reasonable interval, may close any valves and/or plugs at the service panels, disconnect the drain line and secure the access port hatch. The technician has now completed his servicing of the waste tank 12.

When the valve assembly 30 is seated, sealing the tank 12, the precharge reservoir 44 still retains a supply of cleaning/rinsing fluid. The fluid retained within the reservoir 44 will be discharged either through the spray rinse nozzle 50 or through a reservoir drain 46 which has been provided for this purpose. The reservoir tank contents thereby become the waste tank precharge that is recommended prior to placing the waste tank into use. Such a precharge is essential if a recirculating toilet system is employed, and is nevertheless useful in conjunction with other types of toilet systems for odor control.

Turning next to FIG. 5, there is shown, in side section view, an alternative precharge reservoir 144 for the present invention. As seen, the reservoir 144 includes a substantially rigid outer enclosure 146, in which is placed a collapsible bladder-reservoir 148. An inlet 150 supplies fluid to the reservoir 144 and an outlet 152 is adapted to be coupled to a rinsing apparatus such as the spray ring 50 illustrated in FIG. 4 above.

An outlet valve 154 releases the content of the collapsible bladder reservoir 148 into the outer enclosure 146. The opening of outlet valve 154 is sufficiently small so that the fluid under pressure, when applied to the inlet 150, fully expands the bladder reservoir 148 to the dotted position, shown in FIG. 5. When the fluid is no longer provided, the pressure drops and the fluid held within the bladder-reservoir 148 is permitted to escape through the outlet valve 154 as the bladder collapses to its normal, uninflated state.

A check valve 156 prevents fluid from leaving the bladder reservoir 148 except through the outlet valve 154. As fluid flows into the outer enclosure 146, it continues to exit through the outlet 152 into the spray ring 50 and supplies the precharge to the waste tank discussed above.

Clearly other precharge reservoir embodiments can be provided which are collapsible and tend to return to the collapsed state. Further, other embodiments of a hydraulic valve operating system can be devised according to the present invention without departing from its spirit or its teachings. Accordingly, the scope of invention should be limited only by the scope of the claims appended hereto.

What is claimed as new is:

1. The combination with a lavatory waste tank having a drain valve and means for rinsing the tank of:

(a) hydraulic valve operating means operatively connected to the tank rinse intake line for opening the drain valve when applied rinsing fluid pressure exceeds a predetermined value; and (b) precharge [storage] *delivery* means[, interposed in the rinse liquid flow path between said valve operating means and the tank rinsing means];

whereby connection of a source of rinsing liquid under pressure to the rinse intake line first operates said hydraulic valve operating means to open the drain valve [and then fills said precharge storage means before rinsing the tank,] and whereby terminating the flow of rinsing liquid to said hydraulic valve operating means permits the drain valve to close, *and* said precharge [storage] *delivery* means [then emptying its contents into the tank] after the drain valve closes [as] *to apply* a measured precharge of fluid to the waste system.

2. The apparatus of claim 1, above, wherein said hydraulic valve operating means include a piston coupled to the drain valve; a cylinder housing said piston, and means for applying rinsing fluid to drive said piston for opening the drain valve.

3. The apparatus of claim 2, above, wherein said hydraulic operating means include bias means for maintaining said piston in an initial position in which the drain valve is kept closed.

4. The combination of claim 3, above further including manual override means, including cable means having a pull ring coupled to said piston and operable from the exterior of the waste tank to manually open the drain valve by a pulling of said cable means and said piston against said bias means to a substantially fully open configuration, whereby applied fluid under pressure flows through said cylinder means to said precharge [storage] *delivery* means.

5. The apparatus of claim 2, above wherein said cylinder includes an outlet port for passing rinsing fluid to said precharge [storage] *delivery* means and wherein said outlet port is operatively coupled to the tank rinse intake line when said piston has been driven to open the drain valve.

6. For use with a waste tank having a drain valve, a hydraulic valve actuator comprising:

(a) first means adapted to connect to a source of fluid under pressure;

(b) piston means, connected to the drain valve;

(c) bias means acting upon said piston to maintain the drain valve in the closed position;

(d) cylinder means carrying said piston means for linear motion therein and coupled to said first means to apply fluid under pressure to drive said piston means against said bias means for opening the drain valve; and (e) outlet means coupled to said cylinder means for releasing fluid from said cylinder means into the waste tank;

whereby application of fluid to said piston means under pressure greater than said bias means, moves said piston to open the drain valve [and supply fluid to the waste tank for cleaning while draining the tank] and, in the absence of fluid under pressure, said bias means returns said piston means, thereby closing the drain valve.

7. The apparatus of claim 6 above, further including precharge tank means coupled to said outlet means for storing a predetermined volume of fluid for subsequent release to the tank as a precharge.

8. The apparatus of claim 7 above, further including tank rinsing means coupled to said precharge tank means, for rinsing the waste tank with applied fluid under pressure, while the drain valve is held open.

9. The combination of claim 6 above, further including tank rinsing means and precharge reservoir means, coupled to said outlet means.

10. The combination of claim 9 above, further wherein said precharge reservoir means includes means for slowly draining its contents into the waste tank.

11. The combination of claim 6, above further including manual override means, including cable means having a pull ring, coupled to said piston and operable from the exterior of the waste tank to manually open the drain valve by a pulling of said cable means and said piston against said bias means to a substantially fully open configuration, whereby applied fluid under pressure flows through said cylinder means to said precharge reservoir.

12. The combination with a lavatory waste tank having a drain valve and means for rinsing the tank of:

(a) precharge storage means, interposed in the rinse liquid flow path between said valve operating means and the tank rinsing means;

whereby connection of a source of rinsing liquid under pressure to the means for rinsing the tank fills said precharge storage means before rinsing the tank, and whereby, after termination of the flow of rinsing liquid, said precharge storage means empties its contents into the tank as a measured precharge of fluid to the waste system.

13. The apparatus of claim 12, above, wherein said precharge storage means includes a reservoir coupled to the tank rinsing means and additional reservoir drain means for emptying said reservoir into the tank.

14. The apparatus of claim 12, above wherein precharge storage means include an expandible reservoir capable of accepting a predetermined volume of fluid under pressure.

* * * * *